US012781117B2

(12) United States Patent
Santra

(10) Patent No.: US 12,781,117 B2
(45) Date of Patent: Nov. 3, 2026

(54) DRILLING WITH WATER-BASED MUD INCLUDING MULTIPLE CLAYS

(71) Applicant: Saudi Arabian Oil Company, Dhahran (SA)

(72) Inventor: Ashok Santra, Woodlands, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/643,715

(22) Filed: Apr. 23, 2024

(65) Prior Publication Data

US 2025/0326963 A1 Oct. 23, 2025

(51) Int. Cl.

| | |
|---|---|
| ***E21B 21/01*** | (2006.01) |
| ***C09K 8/14*** | (2006.01) |
| ***C09K 8/16*** | (2006.01) |
| ***C09K 8/20*** | (2006.01) |
| ***E21B 3/00*** | (2006.01) |
| ***E21B 36/00*** | (2006.01) |

(52) U.S. Cl.

CPC ................ *C09K 8/145* (2013.01); *C09K 8/16* (2013.01); *C09K 8/206* (2013.01); *E21B 3/00* (2013.01); *E21B 21/01* (2013.01); *E21B 36/001* (2013.01); *C09K 2208/12* (2013.01)

(58) Field of Classification Search

CPC . C09K 8/03; C09K 8/032; C09K 8/04; C09K 8/145; C09K 8/16; C09K 8/206; C09K 8/14; C09K 8/22; C09K 2208/12; E21B 3/00; E21B 21/00; E21B 21/01; E21B 21/003; E21B 36/001

See application file for complete search history.

(56) References Cited

U.S. PATENT DOCUMENTS

| | | | | |
|---|---|---|---|---|
| 6,475,959 | B1 * | 11/2002 | Lange | C09K 8/032 507/140 |
| 7,293,609 | B2 | 11/2007 | Dealy et al. | |
| 9,869,156 | B2 * | 1/2018 | Reddy | C09K 8/512 |
| 11,365,341 | B2 * | 6/2022 | Patil | C09K 8/508 |
| 11,781,054 | B1 * | 10/2023 | Elkatatny | C09K 8/145 175/65 |
| 2014/0367103 | A1 * | 12/2014 | Michaux | C09K 8/24 166/292 |

(Continued)

FOREIGN PATENT DOCUMENTS

CN 110734754 A * 1/2020 ............. C09K 8/467

OTHER PUBLICATIONS

Mi Swaco, M-I Gel viscosifier, 2021, Schlumberger, retrieved Apr. 7, 2025 from https://www.slb.com/-/media/files/mi/product-sheet/m-i-gel-ps.ashx (Year: 2021).*

(Continued)

*Primary Examiner* — Angela M DiTrani Leff
(74) *Attorney, Agent, or Firm* — Fish & Richardson P.C.

(57) ABSTRACT

An aqueous drilling fluid is flowed from a surface location through a drill string and into a wellbore formed in a subterranean formation. The aqueous drilling fluid includes bentonite and a synthetic clay. While flowing the aqueous drilling fluid, a drill bit coupled to the drill string is rotated within the wellbore, thereby cutting into the subterranean formation and elongating the wellbore. The drilling fluid from the wellbore is received at the surface location.

14 Claims, 5 Drawing Sheets

(56) References Cited

U.S. PATENT DOCUMENTS

| | | | | |
|---|---|---|---|---|
| 2019/0008749 | A1 | 1/2019 | Harris et al. | |
| 2021/0396098 | A1* | 12/2021 | Morrison | E21B 37/08 |

OTHER PUBLICATIONS

English translation of CN 110734754 A (Year: 2020).*
Huang et al., "Laponite: a promising nanomaterial to formulate high-performance water-based drilling fluids," Petroleum Science, Sep. 2020, 18:579-590, 12 pages.
Huang et al., "Nanoscale Laponite as a Potential Shale Inhibitor in Water-Based Drilling Fluid for Stabilization of Wellbore Stability and Mechanism Study," ACS Applied Materials & Interfaces, Sep. 2018, 37 pages.
Xiong et al., "Performance evaluation of laponite as a mud-making material for drilling fluids," Petroleum Science, Jan. 2019, 16:890-900, 11 pages.
Xu et al., "Properties of Bentonite Slurry Drilling Fluid in Shallow Formations of Deepwater Wells and the Optimization of Its Wellbore Strengthening Ability While Drilling," ACS Omega, 2022, 7(44):39860-39874, 15 pages.

* cited by examiner

200

300

400

500

DRILLING WITH WATER-BASED MUD INCLUDING MULTIPLE CLAYS

TECHNICAL FIELD

This disclosure relates to drilling fluids, and in particular, water-based drilling fluids.

BACKGROUND

Natural resources such as gas, oil, and water in a subterranean formation can be produced by drilling a wellbore into the subterranean formation while circulating a drilling fluid in the wellbore. Drilling fluids are used in oil and gas drilling to assist with lubricating the drill bit, ensuring well safety, forming filter cakes to minimize fluid loss into drilling formations, and transporting rock debris to the surface of the well. Some of the functions of a drilling fluid include suspending drill cuttings (for example, while drilling is paused or while the drilling assembly is brought in and out of the hole), carrying drill cuttings out of the hole, providing hydrostatic pressure to prevent formation fluids from entering the wellbore while it is being drilled, and keeping the drill bit cool and clean while drilling. Three exemplary types of drilling fluids include water-based muds, non-aqueous muds (such as oil-based muds), and gaseous drilling fluids. The type of drilling fluid used in drilling a wellbore can be chosen based on the characteristics of the subterranean formation in which the wellbore is to be formed.

SUMMARY

This disclosure describes technologies relating to drilling fluids, and in particular, water-based drilling fluids including multiple clays. Certain aspects of the subject matter described can be implemented as a method. A drill bit is rotated against a subterranean formation, thereby cutting into the subterranean formation and forming a wellbore. An aqueous drilling fluid is circulated through a drill string coupled to the drill bit, thereby lubricating and cooling the drill bit, wherein the aqueous drilling fluid comprises bentonite and a synthetic clay at a bentonite to synthetic clay ratio of about 5:1.

This, and other aspects, can include one or more of the following features. In some implementations, the bentonite has a density of about 2,300 kilograms per cubic meter (kg/m$^3$), and the synthetic clay has a density of about 1,000 kg/m$^3$. In some implementations, the aqueous drilling fluid is substantially free of sepiolite. In some implementations, the aqueous drilling fluid has a yield point (YP) in a range of from about 2,394 dynes per square centimeter (dyne/cm$^2$) to about 23,940 dyne/cm$^2$. In some implementations, the synthetic clay has an average particle diameter in a range of from about 1 nanometer (nm) to about 50 nm. In some implementations, the aqueous drilling fluid comprises from about 0.1 weight percent (wt. %) to about 2 wt. % bentonite and from about 0.01 wt. % to about 1 wt. % synthetic clay. In some implementations, the aqueous drilling fluid comprises water and at least one of a pH modifier, a filtration control agent, a thickening agent, a clay inhibitor, or a weighting material. In some implementations, the aqueous drilling fluid includes from about 20 wt. % to about 90 wt. % water. In some implementations, the aqueous drilling fluid includes from about 0.01 wt. % to about 1 wt. % soda ash. In some implementations, the aqueous drilling fluid includes from about 0.1 wt. % to about 2 wt. % starch. In some implementations, the aqueous drilling fluid includes from about 0.01 wt. % to about 1 wt. % xanthan gum. In some implementations, the aqueous drilling fluid includes from about 0.01 wt. % to about 1 wt. % caustic soda. In some implementations, the aqueous drilling fluid includes from about 0.01 wt. % to about 1 wt. % clay inhibitor. In some implementations, the aqueous drilling fluid includes a balance of the weighting material.

Certain aspects of the subject matter can be implemented as a method. An aqueous drilling fluid is flowed from a surface location through a drill string and into a wellbore formed in a subterranean formation. At least a portion of the drill string is disposed within the wellbore. The aqueous drilling fluid includes bentonite and a synthetic clay at a bentonite to synthetic clay ratio of about 5:1. While flowing the aqueous drilling fluid, a drill bit coupled to the drill string is rotated within the wellbore, thereby cutting into the subterranean formation and elongating the wellbore. The drilling fluid is received from the wellbore at the surface location.

This, and other aspects, can include one or more of the following features. In some implementations, the bentonite has a density of about 2,300 kilograms per cubic meter (kg/m$^3$), and the synthetic clay has a density of about 1,000 kg/m$^3$. In some implementations, the aqueous drilling fluid is substantially free of sepiolite. In some implementations, the aqueous drilling fluid has a yield point (YP) in a range of from about 2,394 dynes per square centimeter (dyne/cm$^2$) to about 23,940 dyne/cm$^2$. In some implementations, the synthetic clay has an average particle diameter in a range of from about 1 nanometer (nm) to about 50 nm. In some implementations, the aqueous drilling fluid comprises from about 0.1 weight percent (wt. %) to about 2 wt. % bentonite and from about 0.01 wt. % to about 1 wt. % synthetic clay. In some implementations, the aqueous drilling fluid comprises water and at least one of a pH modifier, a filtration control agent, a thickening agent, a clay inhibitor, or a weighting material. In some implementations, the aqueous drilling fluid includes from about 20 wt. % to about 90 wt. % water. In some implementations, the aqueous drilling fluid includes from about 0.01 wt. % to about 1 wt. % soda ash. In some implementations, the aqueous drilling fluid includes from about 0.1 wt. % to about 2 wt. % starch. In some implementations, the aqueous drilling fluid includes from about 0.01 wt. % to about 1 wt. % xanthan gum. In some implementations, the aqueous drilling fluid includes from about 0.01 wt. % to about 1 wt. % caustic soda. In some implementations, the aqueous drilling fluid includes from about 0.01 wt. % to about 1 wt. % clay inhibitor. In some implementations, the aqueous drilling fluid includes a balance of the weighting material.

Certain aspects of the subject matter can be implemented as a drilling rig. The drilling rig includes a drill string assembly and a fluid circulation system. The drill string assembly includes a rotatable drill bit. The fluid circulation system is connected to the drill string assembly. The fluid circulation system includes an aqueous drilling fluid, a drilling fluid pit, and a pump. The aqueous drilling fluid includes bentonite and a synthetic clay at a bentonite to synthetic clay ratio of about 5:1. The drilling fluid pit holds a volume (or at least a portion) of the aqueous drilling fluid. The pump is configured to flow the drilling fluid from the drilling fluid pit to the drill string assembly while the rotatable drill bit rotates.

This, and other aspects, can include one or more of the following features. In some implementations, the bentonite has a density of about 2,300 kilograms per cubic meter (kg/m$^3$), and the synthetic clay has a density of about 1,000 kg/m$^3$. In some implementations, the aqueous drilling fluid is substantially free of sepiolite. In some implementations, the aqueous drilling fluid has a yield point (YP) in a range of from about 2,394 dynes per square centimeter (dyne/cm$^2$) to about 23,940 dyne/cm$^2$. In some implementations, the synthetic clay has an average particle diameter in a range of from about 1 nanometer (nm) to about 50 nm. In some implementations, the aqueous drilling fluid comprises from about 0.1 weight percent (wt. %) to about 2 wt. % bentonite and from about 0.01 wt. % to about 1 wt. % synthetic clay. In some implementations, the aqueous drilling fluid comprises water and at least one of a pH modifier, a filtration control agent, a thickening agent, a clay inhibitor, or a weighting material. In some implementations, the aqueous drilling fluid includes from about 20 wt. % to about 90 wt. % water. In some implementations, the aqueous drilling fluid includes from about 0.01 wt. % to about 1 wt. % soda ash. In some implementations, the aqueous drilling fluid includes from about 0.1 wt. % to about 2 wt. % starch. In some implementations, the aqueous drilling fluid includes from about 0.01 wt. % to about 1 wt. % xanthan gum. In some implementations, the aqueous drilling fluid includes from about 0.01 wt. % to about 1 wt. % caustic soda. In some implementations, the aqueous drilling fluid includes from about 0.01 wt. % to about 1 wt. % clay inhibitor. In some implementations, the aqueous drilling fluid includes a balance of the weighting material.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Drilling fluids can be optimized to maximize efficiency while minimizing production costs. An interesting property of drilling fluids, thixotropy, is of major interest in the oil and gas industry. A thixotropic fluid is one where the viscosity changes with time under varying shear rates until reaching an equilibrium point where the mud becomes gel-like. Drilling fluids should exhibit thixotropy in order to lift drill cuttings, support weighting materials, and support a timely drilling schedule. Thixotropy is also desirable to prevent or mitigate fluid loss and flow into surround rock formations.

Laponite® and Laponite-RD® is a synthetic hectorite-like clay mineral that was originally used as an additive to improve the colloidal properties of paint in that industry. Laponite® and Laponite-RD® have higher purity than its natural counterparts, has adjustable physical and chemical properties, and does not rely on scarce natural resources.

This disclosure describes water-based (aqueous) drilling mud formulations including multiple clays. Drilling mud can also be referred to as drilling fluid. The drilling mud formulations of the present disclosure that include a synthetic clay (such as Laponite® and Laponite-RD®) and bentonite resulted in synergistic improvement of rheological behavior. For example, inclusion of the synthetic clay and bentonite in the water-based drilling mud resulted in significantly increased viscosity, especially at low shear-rate rheology regions. Inclusion of both the synthetic clay and bentonite in the water-based drilling mud was shown to improve particulate suspension capability of the drilling mud, which can help to mitigate and/or eliminate the risk of sagging and stuck pipe during drilling operations, which can lead to a loss of net productive time.

Figure 1:
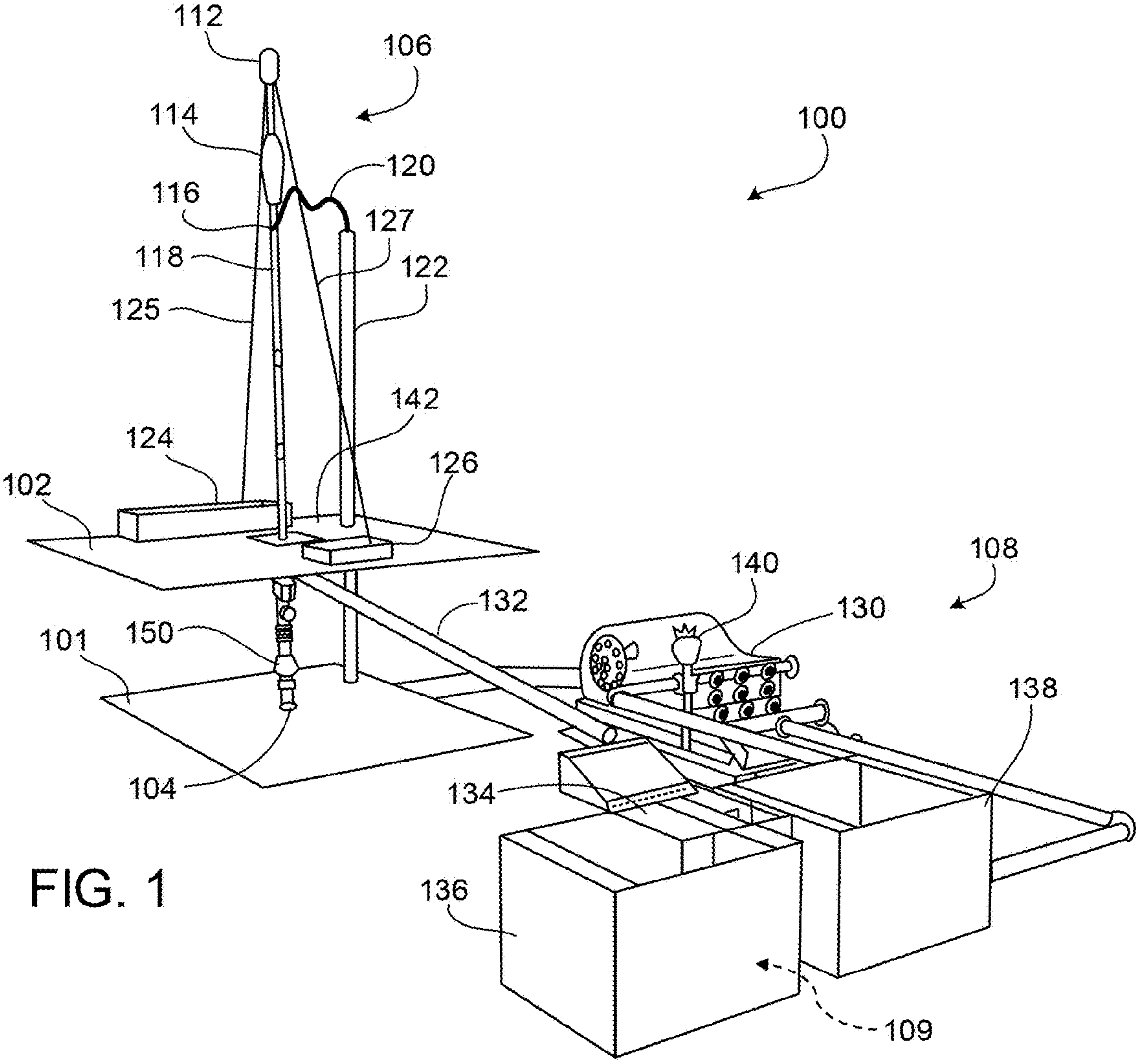
FIG. 1 is a schematic diagram of an example well being drilled in a subterranean formation.

FIG. 1 is a schematic perspective view of an example rig system 100 for drilling and producing a well. The well can extend from the surface through the Earth to one or more subterranean zones of interest. The example rig system 100 includes a drill floor 102 positioned above the surface, a wellhead 104, a drill string assembly 106 supported by the rig structure, and a fluid circulation system 108 to filter used drilling fluid from the wellbore and provide clean drilling fluid to the drill string assembly 106. For example, the example rig system 100 of FIG. 1 is shown as a drill rig capable of performing a drilling operation with the rig system 100 supporting the drill string assembly 106 over a wellbore. The wellhead 104 can be used to support casing or other well components or equipment into the wellbore of the well.

The derrick or mast is a support framework mounted on the drill floor 102 and positioned over the wellbore to support the components of the drill string assembly 106 during drilling operations. A crown block 112 forms a longitudinally-fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, and the kelly 118 turns with the drill string assembly 106 as the rotary table 142 of the drill string assembly turns.

In the example rig system 100 of FIG. 1, the drill string assembly 106 is made up of drill pipes with a drill bit (not shown) at a longitudinally bottom end of the drill string. The drill pipe can include hollow steel piping, and the drill bit can include cutting tools, such as blades, dics, rollers, cutters, or a combination of these, to cut into the formation and form the wellbore. The drill bit rotates and penetrates through rock formations below the surface under the combined effect of axial load and rotation of the drill string assembly 106. In some implementations, the kelly 118 and swivel 116 can be replaced by a top drive that allows the drill string assembly 106 to spin and drill. The wellhead assembly 104 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The wellhead assembly 104 also includes a blowout preventer 150 positioned at the surface 101 of the well and below (but often connected to) the drill floor 102. The blowout preventer 150 acts to prevent well blowouts caused by formation fluid entering the wellbore, displacing drilling fluid, and flowing to the surface at a pressure greater than atmospheric pressure. The blowout preventer 150 can close around (and in some instances, through) the drill string assembly 106 and seal off the space between the drill string and the wellbore wall.

During a drilling operation of the well, the circulation system 108 circulates drilling fluid 109 into the wellbore, circulates used drilling fluid 109 from the wellbore to the drill string assembly 106, filters used drilling fluid 109 from the wellbore, and provides clean drilling fluid 109 to the drill string assembly 106. The example circulation system 108 includes a fluid pump 130 that fluidly connects to and provides drilling fluid 109 to drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling fluid 109 from the surface, through the drill string assembly 106, out the drill bit and back up the annulus of the wellbore, where the annulus is the space between the drill pipe and the formation or casing. The density of the drilling fluid 109 is intended to be greater than the formation pressures to prevent formation fluids from entering the annulus and flowing to the surface and less than the mechanical strength of the formation, as a greater density may fracture the formation, thereby creating a path for the drilling fluid 109 to go into the formation. Apart from well control, drilling fluid 109 can also cool the drill bit and lift rock cuttings from the drilled formation up the annulus and to the surface to be filtered out and treated before it is pumped down the drill string assembly 106 again. The drilling fluid 109 returns in the annulus with rock cuttings and flows out to the flow-out line 132, which connects to and provides the fluid to the shale shaker 134. The flow-out line 132 is an inclined pipe that directs the drilling fluid 109 from the annulus to the shale shaker 134. The shale shaker 134 includes a mesh-like surface to separate the coarse rock cuttings from the drilling fluid 109, and finer rock cuttings and drilling fluid 109 then go through the settling pit 136 to the suction pit 138. The circulation system 108 includes a mud hopper 140 into which materials (for example, to provide dispersion, rapid hydration, and uniform mixing) can be introduced to the circulation system 108. The fluid pump 130 cycles the drilling fluid 109 up the standpipe 122 through the swivel 116 and back into the drill string assembly 106 to go back into the well.

The example wellhead assembly 104 can take a variety of forms and include a number of different components. For example, the wellhead assembly 104 can include additional or different components than the example shown in FIG. 1. Similarly, the circulation system 108 can include additional or different components than the example shown in FIG. 1.

The drilling fluid 109 is an aqueous drilling fluid that includes bentonite and a synthetic clay. In some implementations, the drilling fluid 109 has a bentonite to synthetic clay ratio of about 5:1. Including a 5:1 ratio of bentonite to synthetic clay in the drilling fluid 109 can yield synergistic rheological characteristics in the drilling fluid 109. For example, the drilling fluid 109 having a bentonite to synthetic clay ratio of about 5:1 can exhibit enhanced viscosity. In some implementations, the drilling fluid 109 is circulated through the drill string assembly 106 and through the well being drilled, such that a yield point (YP) of the drilling fluid 109 is in a range of from about 2,394 dynes per square centimeter (dyne/cm$^2$) to about 23,940 dyne/cm$^2$. For example, the drilling fluid 109 is circulated through the drill string assembly 106 and through the well being drilled, such that a yield point (YP) of the drilling fluid 109 is greater or equal to about 3,830 dyne/cm$^2$. Yield point is the resistance of initial flow of the drilling fluid 109. Yield point can be considered the stress required in order to begin flow of the drilling fluid 109. For example, according to the Bingham plastic model, yield point can be calculated by subtracting the dial reading at 600 RPM from double the dial reading at 300 RPM. RPM stands for revolutions per minute, for example, of a rheometer. A fluid having a YP value of equal to or greater than 2,394 dyne/cm$^2$ and less than 50 dyne/cm$^2$ can be considered a fluid with good solid suspension capacity.

The bentonite included in the drilling fluid 109 can have a density in a range of from about 2,200 kilograms per cubic meter (kg/m$^3$) to about 2,800 kg/m$^3$. For example, the bentonite included in the drilling fluid 109 can have a density of about 2,200 kg/m$^3$, about 2,300 kg/m$^3$, about 2,400 kg/m$^3$, about 2,500 kg/m$^3$, about 2,600 kg/m$^3$, about 2,700 kg/m$^3$, or about 2,800 kg/m$^3$. In some implementations, the bentonite included in the drilling fluid 109 can have an average particle diameter in a range of from about 0.1 micrometers (m) to about 2,000 m. The synthetic clay included in the drilling fluid 109 can have a density in a range of from about 700 kg/m$^3$ to about 1,300 kg/m$^3$. For example, the synthetic clay included in the drilling fluid 109 can have a density of about 700 kg/m$^3$, about 800 kg/m$^3$, about 900 kg/m$^3$, about 1,000 kg/m$^3$, about 1,100 kg/m$^3$, about 1,200 kg/m$^3$, or about 1,300 kg/m$^3$. In some implementations, the drilling fluid 109 includes from about 0.1 weight percent (wt. %) to about 2 wt. % bentonite. In some implementations, the drilling fluid 109 includes from about 0.01 wt. % to about 1 wt. % synthetic clay. For example, in implementations in which the bentonite to synthetic clay ratio of the drilling fluid 109 is about 5:1, the drilling fluid 109 can include about 1 wt. % bentonite and about 0.2 wt. % synthetic clay. As another example, the drilling fluid 109 can include about 0.5 wt. % bentonite and about 0.1 wt. % synthetic clay. As another example, the drilling fluid 109 can include about 2 wt. % bentonite and about 0.4 wt. % synthetic clay. In some implementations, the synthetic clay has an average particle diameter in a range of from about 1 nanometer (nm) to about 50 nm.

In some implementations, the drilling fluid 109 has a plastic viscosity in a range of from about 10 cP to about 40 cP. Plastic viscosity is the resistance offered by the drilling fluid 109 to flow freely. Plastic viscosity can indicate the viscosity of the drilling fluid 109 when extrapolated to infinite shear rate, for example, based on the Bingham plastic model. Plastic viscosity can be measured, for example, using a viscometer by measuring viscosity at various shear rates.

The drilling fluid 109 can include additional components, such as additives. Some non-limiting examples of additives that can be included in the drilling fluid 109 (either individually or in combination) include a pH modifier, a filtration control agent, a thickening agent, a clay inhibitor, a weighting material, and an oxygen scavenger. Some non-limiting examples of a pH modifier include soda ash, caustic soda, hydrated lime, barium carbonate, chrome lignosulfonates, and sodium hydroxide. Some non-limiting examples of a filtration control agent include xanthan gum, cellulosic polymer (such as polyanionic cellulose), starch, hydrolyzed polyacrylamide, partially hydrolyzed polyacrylamide, and chemically altered bitumen. Some non-limiting examples of a clay inhibitor include inorganic salts (such as potassium chloride (KCl)), ammonium compounds (such as amine/quaternary compounds), polyacrylamide (such as partially hydrolyzed polyacrylamide), and a glycol blend. Some non-limiting examples of a weighting material include sulfate mineral, barite, hematite, calcium carbonate, and siderite.

Figure 2:
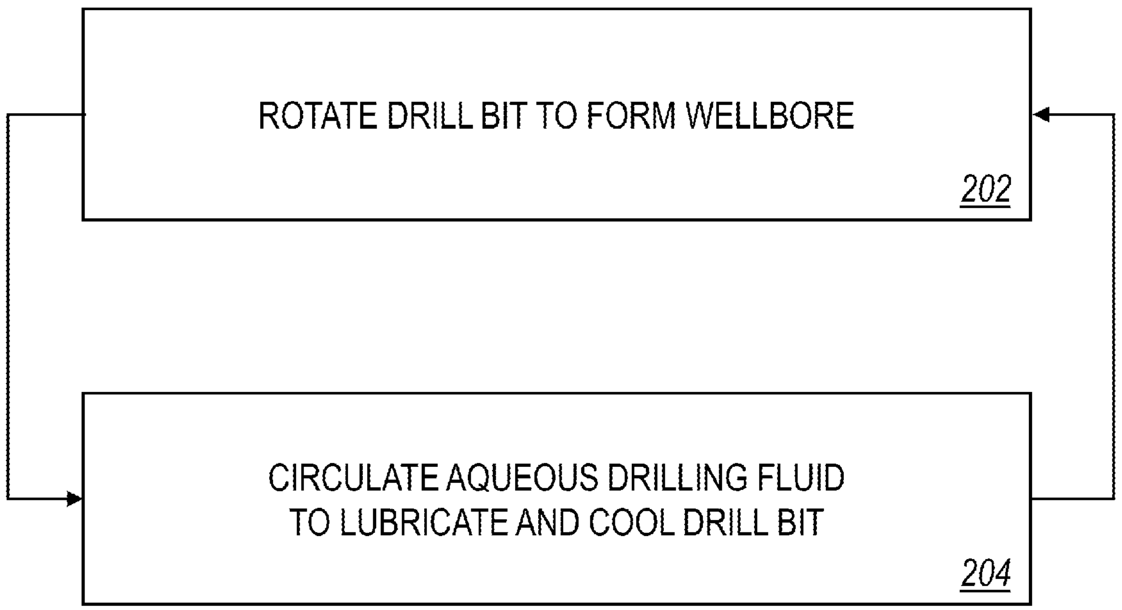
FIG. 2 is a flow chart of an example method for drilling a well.

FIG. 2 is a flow chart of an example method 200 for drilling a wellbore in a subterranean formation. The system 100 can, for example, implement the method 200. At block 202, a drill bit (such as the drill bit of the drill string assembly 106) is rotated against a subterranean formation. Rotating the drill bit against the subterranean formation at block 202 results in the drill bit cutting into the subterranean formation and forming a wellbore. At block 204, an aqueous drilling fluid (such as the drilling fluid 109) is circulated through a drill string coupled to the drill bit (such as the drill string assembly 106). Circulating the drilling fluid 109 through the drill string at block 204 can lubricate and cool the drill bit as the drill bit cuts into the subterranean formation at block 202. The drilling fluid 109 can be circulated through the drill string at block 204, for example, by the circulation system 108. As described previously, the drilling fluid 109 can include bentonite and synthetic clay at a bentonite to synthetic clay ratio of about 5:1. Blocks 202 and 204 of the method 200 can overlap in time. In other words, blocks 202 and 204 can occur simultaneously.

Figure 3:
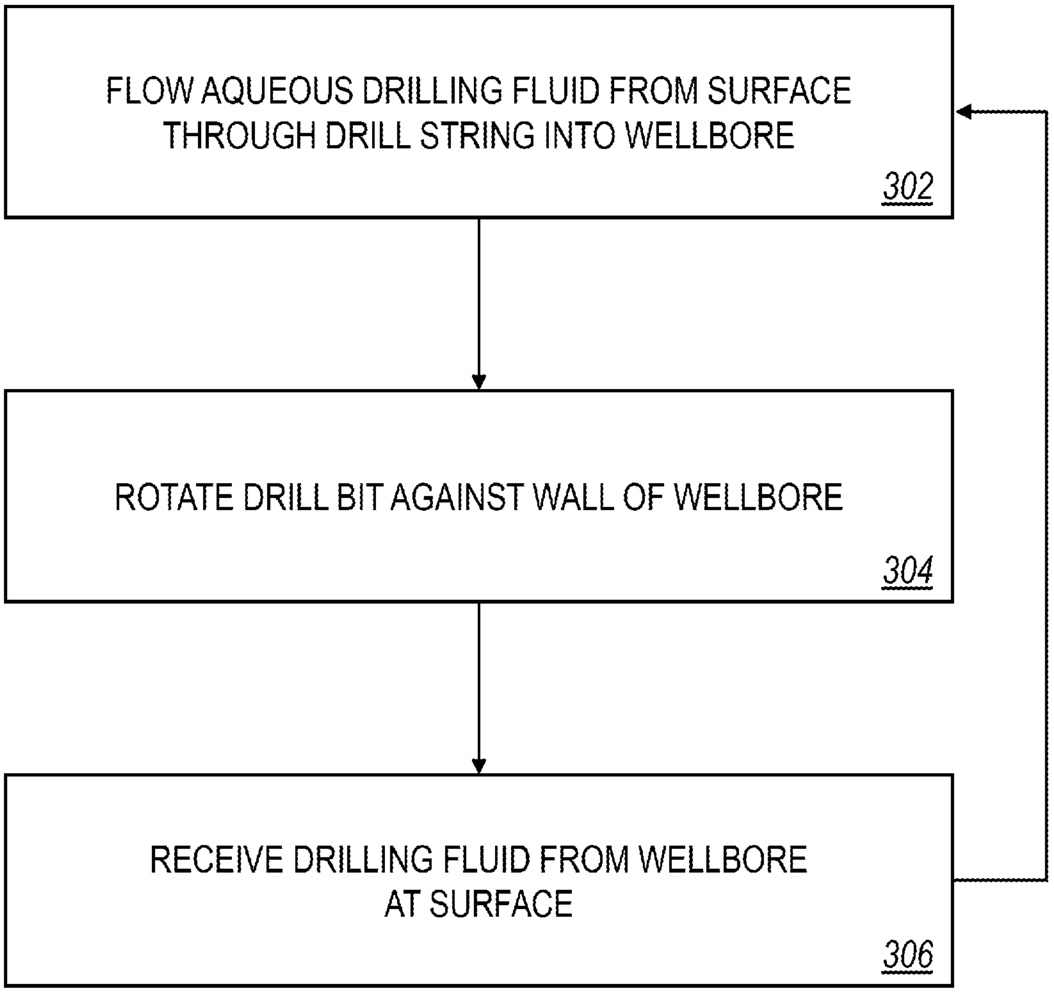
FIG. 3 is a flow chart of an example method for drilling a well.

FIG. 3 is a flow chart of an example method 300. The system 100 can, for example, implement the method 300. At block 302, an aqueous drilling fluid (such as the drilling fluid 109) is flowed from a surface location through a drill string (such as the drill string assembly 106) and into a wellbore formed in a subterranean formation. At least a portion of the drill string is disposed within the wellbore at block 302. While the drilling fluid 109 is flowed at block 302, a drill bit coupled to the drill string is rotated within the wellbore at block 304. Rotating the drill bit within the wellbore at block 304 results in the drill bit cutting into the subterranean formation and elongating the wellbore. For example, the drill bit is rotated against a wall of the wellbore at block 304. At block 306, the drilling fluid from the wellbore is received at the surface location. Blocks 302, 304, and 306 of the method 300 can overlap in time. In other words, blocks 302, 304, and 306 can occur simultaneously. Blocks 302, 304, and 306 can be repeated until the well has been fully drilled.

By flowing the drilling fluid 109 from the surface location and into the wellbore at block 302 and receiving the drilling fluid 109 from the wellbore at the surface location at block 306, the drilling fluid 109 is circulated through the wellbore. The circulation of the drilling fluid 109 through the wellbore can be performed, for example, by the circulation system 108.

EXAMPLES

Various water-based (aqueous) mud formulations (drilling fluid) were tested. The test mud formulations included various combinations of bentonite, sepiolite, Laponite-RD®, and halloysite. The test mud formulations were mixed using API RP 13B procedure and were hot rolled at 120 degrees Fahrenheit (° F.) (48.9 degrees Celsius (° C.)) for 16 hours. The shear stress as a function of shear rates at various temperatures was calculated using viscometers (specifically Model 35 Viscometer and iX77™ Rheometer by FANN®). Oscillatory testing was performed to follow storage (G') and loss (G") modulus development using an Anton Paar rheometer. The data from these tests were compared with non-Newtonian models, such as power-law model, Herschel-Bulkley model, and Bingham plastic model to determine the most appropriate rheological model.

A comparison of the rheological properties of the test mud formulations demonstrated the effectiveness of various combinations of clays with respect to bentonite in water-based mud. The results of the tests demonstrated synergistically improved rheological properties of water-based drilling muds in test mud formulations including both bentonite and Laponite-RD® across all tested temperature ranges. The test mud formulation including both bentonite and Laponite-RD® exhibited excellent yield point and 10-second and 10-minute gel strength at low shear rates, while maintaining good fluidity and plastic viscosity. The synergy of bentonite and Laponite-RD® in the test mud formulation could be attributed to optimal combinations of sizes, shapes, and aspect ratios of the respective clay particles. The tested bentonite had a chemical formula of $Al_2H_2Na_2O_{13}Si_4$ and a density of 2,300 kg/m$^3$. The tested sepiolite had a chemical formula of $Mg_4Si_6O_{15}(OH)_2{\cdot}6H_2O$ and a density of 2,200 kg/m$^3$. The tested Laponite-RD® had a chemical formula of $Na_{0.7}Si_8Mg_{5.5}Li_{0.3}O_{20}(OH)_4$, a density of 1,000 kg/m$^3$, and an average particle size of 25 nm. Table 1 below provides the rheological measurements of test mud formulations including: (i) 3 wt. % bentonite; (ii) 5 wt. % bentonite; (iii) 1 wt. % Laponite-RD®; (iv) 2 wt. % Laponite-RD®; (v) 5 wt. % bentonite and 0.5 wt. % Laponite-RD®; and (vi) 5 wt. % bentonite and 1 wt. % Laponite-RD®. 10s refers to 10-second gel strength. 10m refers to 10-minute gel strength. PV stands for plastic viscosity. YP stands for yield point. LSYP stands for low shear yield point. Ta refers to yield shear stress.

TABLE 1

FANN ® Model 35 Viscometer measurements for various test mud formulations

| Parameter | 3 wt. % bentonite | 5 wt. % bentonite | 1 wt. % Laponite-RD ® | 2 wt. % Laponite-RD ® | 5 wt. % bentonite + 0.5 wt. % Laponite-RD ® | 5 wt. % bentonite + 1 wt. % Laponite-RD ® |
|---|---|---|---|---|---|---|
| 600 RPM | 13 | 47 | 3 | 71 | 45 | 101 |
| 300 RPM | 7 | 31 | 2 | 56 | 34 | 87 |
| 200 RPM | 6 | 25 | 1 | 47 | 30 | 81 |
| 100 RPM | 4 | 18 | 1 | 40 | 26 | 80 |
| 6 RPM | 1 | 10 | 1 | 20 | 21 | 74 |
| 3 RPM | 1 | 9 | 1 | 19 | 21 | 74 |
| 10 s | 4 | 11 | 0 | 19 | 30 | 76 |
| 10 m | 3 | 21 | 1 | 31 | 40 | 72 |
| PV | 6 | 16 | 1 | 15 | 11 | 14 |

TABLE 1-continued

| FANN ® Model 35 Viscometer measurements for various test mud formulations | | | | | | |
|---|---|---|---|---|---|---|
| Parameter | 3 wt. % bentonite | 5 wt. % bentonite | 1 wt. % Laponite-RD ® | 2 wt. % Laponite-RD ® | 5 wt. % bentonite + 0.5 wt. % Laponite-RD ® | 5 wt. % bentonite + 1 wt. % Laponite-RD ® |
| YP | 1 | 15 | 1 | 51 | 23 | 73 |
| LSYP | 1 | 8 | 1 | 18 | 21 | 74 |
| $\tau_0$ | 1 | 8 | 1 | 18 | 21 | 74 |

including at least one of bentonite or Laponite-RD® at 48.9° C.

Figure 4:
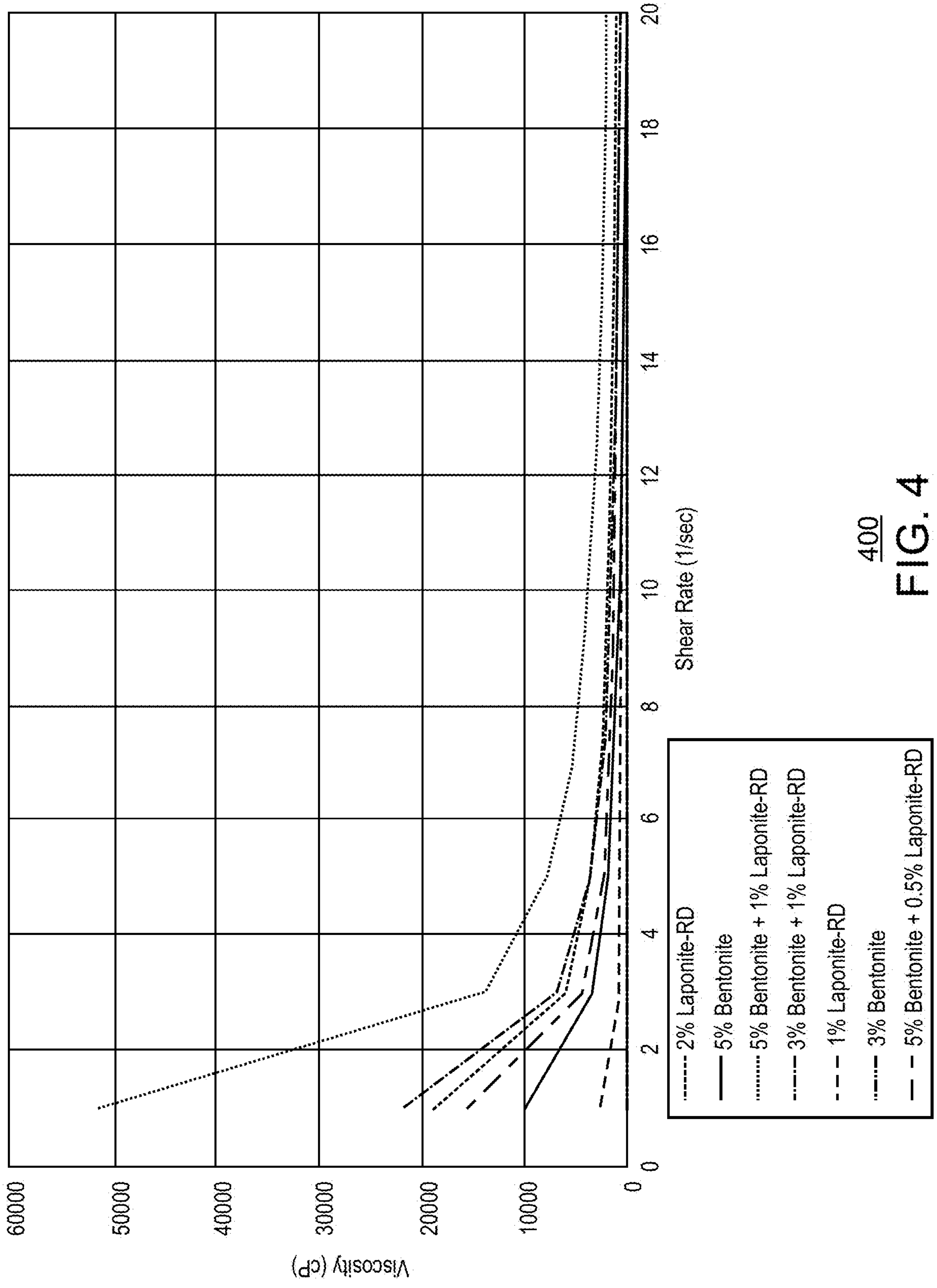
FIG. 4 is a graph of measured viscosity versus shear rate for an aqueous fluid including bentonite and Laponite-RD®.

FIG. 4 is a graph 400 of measured viscosity versus shear rate for an aqueous fluid including bentonite and Laponite-RD®. The graph 400 provides rheological measurements of test mud formulations including: (i) 2 wt. % Laponite-RD®; (ii) 1 wt. % Laponite-RD®; (iii) 5 wt. % bentonite; (iv) 3 wt. % bentonite; (v) 5 wt. % bentonite and 1 wt. % Laponite-RD®; (vi) 5 wt. % bentonite and 0.5 wt. % Laponite-RD®; and (vii) 3 wt. % bentonite and 1 wt. % Laponite-RD®.

The test mud formulation including both Laponite-RD® and sepiolite exhibited antagonistic effects on rheological behavior. Table 2 below provides the rheological measurements of test mud formulations including: (i) 3 wt. % sepiolite; (ii) 5 wt. % sepiolite; (iii) 1 wt. % Laponite-RD®; (iv) 2 wt. % Laponite-RD®; (v) 5 wt. % sepiolite and 0.5 wt. % Laponite-RD®; (vi) 3 wt. % sepiolite and 1 wt. Laponite-RD®; and (vii) 5 wt. sepiolite and 1 wt. Laponite-RD®.

TABLE 2

| FANN ® Model 35 Viscometer measurements for various test mud formulations | | | | | | | |
|---|---|---|---|---|---|---|---|
| Parameter | 3 wt. % sepiolite | 5 wt. % sepiolite | 1 wt. % Laponite-RD ® | 2 wt. % Laponite-RD ® | 5 wt. % sepiolite + 0.5 wt. % Laponite-RD ® | 3 wt. % sepiolite + 1 wt. % Laponite-RD ® | 5 wt. % sepiolite + 1 wt. % Laponite-RD ® |
| 600 RPM | 31 | 110 | 3 | 71 | 17 | 29 | 56 |
| 300 RPM | 23 | 91 | 2 | 56 | 11 | 21 | 46 |
| 200 RPM | 20 | 80 | 1 | 47 | 9 | 17 | 41 |
| 100 RPM | 16 | 65 | 1 | 40 | 7 | 14 | 37 |
| 6 RPM | 7 | 32 | 1 | 20 | 5 | 9 | 33 |
| 3 RPM | 6 | 31 | 1 | 19 | 5 | 9 | 33 |
| 10 s | 9 | 42 | 0 | 19 | 13 | 15 | 43 |
| 10 m | 5 | 50 | 1 | 31 | 26 | 43 | 43 |
| PV | 8 | 19 | 1 | 15 | 6 | 8 | 10 |
| YP | 15 | 72 | 1 | 41 | 5 | 13 | 36 |
| LSYP | 5 | 30 | 1 | 18 | 5 | 9 | 33 |
| $\tau_0$ | 5 | 30 | 1 | 18 | 5 | 9 | 33 |

including at least one of Laponite-RD® or sepiolite at 48.9° C.

Figure 5:
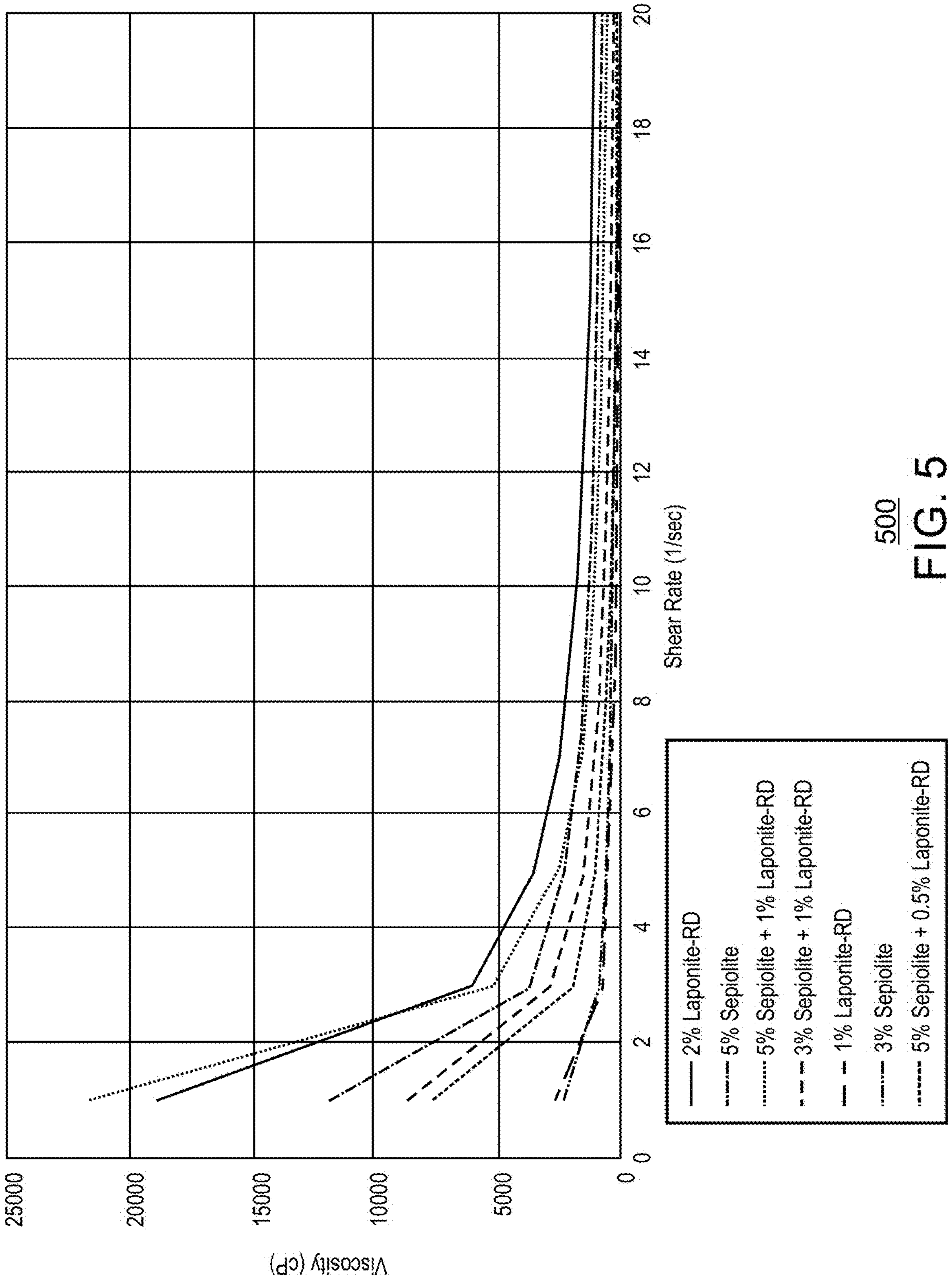
FIG. 5 is a graph of measured viscosity versus shear rate for an aqueous fluid including sepiolite and Laponite-RD®.

FIG. 5 is a graph 500 of measured viscosity versus shear rate for an aqueous fluid including sepiolite and Laponite-RD®. The graph 500 provides rheological measurements of test mud formulations including: (i) 2 wt. % Laponite-RD®; (ii) 1 wt. % Laponite-RD®; (iii) 5 wt. % sepiolite; (iv) 3 wt. % sepiolite; (v) 5 wt. % sepiolite and 1 wt. % Laponite-RD®; (vi) 5 wt. sepiolite and 0.5 wt. % Laponite-RD®; and (vii) 3 wt. % sepiolite and 1 wt. % Laponite-RD®.

Table 3 provides the compositions of (a) an unweighted control mud formulation that did not include Laponite-RD® and (b) an unweighted test mud formulation including Laponite-RD®. The units of the various components in the formulations provided in Table 3 are in weight (grams). Table 4 provides rheological measurements of the mud formulations (a) and (b), whose compositions are provided in Table 3.

TABLE 3

| Unweighted mud formulations | | |
|---|---|---|
| Additive | Control Mud (a) | Test Mud (b) |
| Water | 332.5 | 332.5 |
| Soda ash | 0.25 | 0.25 |
| Bentonite | 5 | 5 |
| Starch | 6 | 6 |
| Xanthan gum | 0.5 | 0.5 |
| Caustic soda | 0.1 | 0.1 |
| Acrylic polymer | 1 | 1 |
| Laponite-RD ® | 0 | 1 |

TABLE 4

| FANN ® Model 35 Viscometer measurements of Control Mud (a) and Test Mud (b) at 48.9° C. after hot rolling at 48.9° C. for 16 hours | | |
|---|---|---|
| Parameter | Control Mud (a) | Test Mud (b) |
| 600 RPM | 36 | 56 |
| 300 RPM | 26 | 41 |
| 200 RPM | 22 | 34 |
| 100 RPM | 16 | 26 |
| 6 RPM | 6 | 9 |
| 3 RPM | 5 | 8 |
| 10 s | 6 | 10 |
| 10 m | 6 | 12 |
| PV | 10 | 15 |
| YP | 16 | 26 |
| LSYP | 4 | 7 |
| $\tau_0$ | 4 | 7 |

Table 5 provides the compositions of (c) a weighted control mud formulation that did not include Laponite-RD® and (d) a weighted test mud formulation including Laponite-RD®. The units of the various components in the formulations provided in Table 6 are in weight (grams). Both Control Mud (c) and Test Mud (d) had a density of about 12.65 pounds per gallon (about 1,516 kg/m$^3$). Table 6 provides rheological measurements of the mud formulations (c) and (d), whose compositions are provided in Table 5.

TABLE 5

| Weighted mud formulations | | |
|---|---|---|
| Additive | Control Mud (c) | Test Mud (d) |
| Water | 287 | 287 |
| Soda ash | 0.23 | 0.23 |
| Bentonite | 2.9 | 2.9 |
| Starch | 5 | 5 |
| Xanthan gum | 0.3 | 0.3 |
| Caustic soda | 0.12 | 0.12 |
| Acrylic polymer | 0.6 | 0.6 |
| Laponite-RD ® | 0 | 1 |
| Barite | 234 | 234 |

TABLE 6

| FANN ® Model 35 Viscometer measurements of Control Mud (c) and Test Mud (d) at 48.9° C. after hot rolling at 48.9° C. for 16 hours | | |
|---|---|---|
| Parameter | Control Mud (c) | Test Mud (d) |
| 600 RPM | 95 | 112 |
| 300 RPM | 68 | 79 |
| 200 RPM | 56 | 64 |
| 100 RPM | 41 | 47 |
| 6 RPM | 15 | 18 |
| 3 RPM | 12 | 15 |
| 10 s | 14 | 15 |
| 10 m | 14 | 25 |
| PV | 27 | 33 |
| YP | 41 | 46 |
| LSYP | 9 | 12 |
| $\tau_0$ | 9 | 12 |

The results shown in Table 1, graph 400 of FIG. 4, and Tables 3-6 clearly demonstrate the synergistic effects of including both Laponite-RD® and bentonite in mud formulations (and in particular at a bentonite to Laponite-RD® ratio of 5:1), especially in low shear rate rheology regions. Without being bound to theory, higher viscosity at low shear rates can indicate greater particular suspension capability of the mud formulation in relation to heavy weight particulates, such as barite, hematite, manganese oxide, and drill cuttings. Inadequate suspension of heavy weight particulates can result in sagging and stuck pipe situations, negatively leading to loss of net productive time (NPT).

Table 7 provides rheological measurements of test mud formulations having varying bentonite to Laponite-RD® ratios. The apparent viscosities shown in Table 7 are defined by the 600 RPM dial reading divided by two. The results in Table 7 demonstrate that the mud formulations including a higher bentonite to Laponite-RD® ratio (for example, 5:1 and 10:1) exhibited improved rheological behavior (for example, higher viscosity) in comparison to the mud formulations including lower bentonite to Laponite-RD® ratios (such as less than 5:1).

TABLE 7

| Apparent viscosities of various mud formulations including bentonite and Laponite-RD ® | | | |
|---|---|---|---|
| Bentonite (grams) | Laponite-RD ® (grams) | Bentonite:Laponite-RD ® Ratio | Apparent viscosity (cP) |
| 5 | 0.5 | 10 | 22.5 |
| 5 | 1 | 5 | 50.5 |
| 4 | 1 | 4 | 10 |
| 4 | 1.5 | 2.67 | 15 |

EMBODIMENTS

In an example implementation (or aspect), a method comprises: rotating a drill bit against a subterranean formation, thereby cutting into the subterranean formation and forming a wellbore; and circulating an aqueous drilling fluid through a drill string coupled to the drill bit, thereby lubricating and cooling the drill bit, wherein the aqueous drilling fluid comprises bentonite and a synthetic clay at a bentonite to synthetic clay ratio of about 5:1.

In an example implementation (or aspect), a method comprises: flowing an aqueous drilling fluid from a surface location through a drill string and into a wellbore formed in a subterranean formation, wherein at least a portion of the drill string is disposed within the wellbore, wherein the aqueous drilling fluid comprises bentonite and a synthetic clay at a bentonite to synthetic clay ratio of about 5:1; while flowing the aqueous drilling fluid, rotating a drill bit coupled to the drill string within the wellbore, thereby cutting into the subterranean formation and elongating the wellbore; and receiving, at the surface location, the drilling fluid from the wellbore.

In an example implementation (or aspect), a drilling rig comprises: a drill string assembly comprising a rotatable drill bit; and a fluid circulation system connected to the drill string assembly, the fluid circulation system comprising: an aqueous drilling fluid comprising bentonite and a synthetic clay at a bentonite to synthetic clay ratio of about 5:1; a drilling fluid pit holding a volume of the aqueous drilling fluid; and a pump configured to flow the drilling fluid from the drilling fluid pit to the drill string assembly while the rotatable drill bit rotates.

In an example implementation (or aspect) combinable with any other example implementation (or aspect), the bentonite has a density of about 2,300 kilograms per cubic meter (kg/m$^3$), and the synthetic clay has a density of about 1,000 kg/m$^3$.

In an example implementation (or aspect) combinable with any other example implementation (or aspect), the aqueous drilling fluid is substantially free of sepiolite.

In an example implementation (or aspect) combinable with any other example implementation (or aspect), the aqueous drilling fluid has a yield point (YP) in a range of from about 2,394 dynes per square centimeter (dyne/$cm^2$) to about 23,940 dyne/$cm^2$.

In an example implementation (or aspect) combinable with any other example implementation (or aspect), the synthetic clay has an average particle diameter in a range of from about 1 nanometer (nm) to about 50 nm.

In an example implementation (or aspect) combinable with any other example implementation (or aspect), the aqueous drilling fluid comprises from about 0.1 weight percent (wt. %) to about 2 wt. % bentonite and from about 0.01 wt. % to about 1 wt. % synthetic clay.

In an example implementation (or aspect) combinable with any other example implementation (or aspect), the aqueous drilling fluid comprises water and at least one of a pH modifier, a filtration control agent, a thickening agent, a clay inhibitor, or a weighting material.

In an example implementation (or aspect) combinable with any other example implementation (or aspect), the aqueous drilling fluid comprises from about 20 wt. % to about 90 wt. % water.

In an example implementation (or aspect) combinable with any other example implementation (or aspect), the aqueous drilling fluid comprises from about 0.01 wt. % to about 1 wt. % soda ash.

In an example implementation (or aspect) combinable with any other example implementation (or aspect), the aqueous drilling fluid comprises from about 0.1 wt. % to about 2 wt. % starch.

In an example implementation (or aspect) combinable with any other example implementation (or aspect), the aqueous drilling fluid comprises from about 0.01 wt. % to about 1 wt. % xanthan gum.

In an example implementation (or aspect) combinable with any other example implementation (or aspect), the aqueous drilling fluid comprises from about 0.01 wt. % to about 1 wt. % caustic soda.

In an example implementation (or aspect) combinable with any other example implementation (or aspect), the aqueous drilling fluid comprises from about 0.01 wt. % to about 1 wt. % clay inhibitor.

In an example implementation (or aspect) combinable with any other example implementation (or aspect), the aqueous drilling fluid comprises a balance of the weighting material.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:

rotating a drill bit against a subterranean formation, thereby cutting into the subterranean formation and forming a wellbore; and circulating an aqueous drilling fluid through a drill string coupled to the drill bit, thereby lubricating and cooling the drill bit, wherein:

the aqueous drilling fluid comprises bentonite and a synthetic clay at a bentonite to synthetic clay ratio of about 5:1;

the bentonite has a density of about 2,200 kilograms per cubic meter ($kg/m^3$) to about 2,800 $kg/m^3$ and the synthetic clay has a density of about 700 $kg/m^3$ to about 1,300 $kg/m^3$;

the aqueous drilling fluid comprises from 0.02 wt. % to 0.4 wt. % of the synthetic clay and from 0.1 wt. % to 2 wt. % of the bentonite; and the aqueous drilling fluid has a yield point from 3,830 dynes per square centimeter ($dynes/cm^2$) to 23,940 $dynes/cm^2$.

2. The method of claim 1, wherein the bentonite has a density of about 2,300 $kg/m^3$, the synthetic clay has a density of about 1,000 $kg/m^3$, and the synthetic clay has a chemical formula of $Na_{0.7}Si_8Mg_{5.5}Li_{0.3}O_{20}(OH)_4$.

3. The method of claim 2, wherein the aqueous drilling fluid is free of sepiolite.

4. The method of claim 3, wherein the synthetic clay has an average particle diameter in a range of from about 1 nanometer (nm) to about 50 nm.

5. The method of claim 4, wherein the aqueous drilling fluid comprises water and at least one of a pH modifier, a filtration control agent, a thickening agent, a clay inhibitor, or a weighting material.

6. The method of claim 5, wherein the aqueous drilling fluid comprises:

from about 20 wt. % to about 90 wt. % water;

from about 0.01 wt. % to about 1 wt. % soda ash;

from about 0.1 wt. % to about 2 wt. % starch;

from about 0.01 wt. % to about 1 wt. % xanthan gum;

from about 0.01 wt. % to about 1 wt. % caustic soda;

from about 0.01 wt. % to about 1 wt. % clay inhibitor; and a balance of the weighting material.

7. A method comprising:

flowing an aqueous drilling fluid from a surface location through a drill string and into a wellbore formed in a subterranean formation, wherein at least a portion of the drill string is disposed within the wellbore, wherein:

the aqueous drilling fluid comprises bentonite and a synthetic clay at a bentonite to synthetic clay ratio of about 5:1;

the bentonite has a density of about 2,200 kilograms per cubic meter ($kg/m^3$) to about 2,800 $kg/m^3$ and the synthetic clay has a density of about 700 $kg/m^3$ to about 1,300 $kg/m^3$;

the aqueous drilling fluid comprises from 0.02 wt. % to 0.4 wt. % of the synthetic clay and from 0.1 wt. % to 2 wt. % of the bentonite; and the aqueous drilling fluid has a yield point from 3,830 dynes per square centimeter ($dynes/cm^2$) to 23,940 $dynes/cm^2$;

while flowing the aqueous drilling fluid, rotating a drill bit coupled to the drill string within the wellbore, thereby cutting into the subterranean formation and elongating the wellbore; and receiving, at the surface location, the drilling fluid from the wellbore.

8. The method of claim 7, wherein the bentonite has a density of about 2,300 $kg/m^3$, the synthetic clay has a density of about 1,000 $kg/m^3$, and the synthetic clay has a chemical formula of $Na_{0.7}Si_8Mg_{5.5}Li_{0.3}O_{20}(OH)_4$.

9. The method of claim 8, wherein the aqueous drilling fluid is free of sepiolite.

10. The method of claim 9, wherein the synthetic clay has an average particle diameter in a range of from about 1 nanometer (nm) to about 50 nm.

11. The method of claim 10, wherein the aqueous drilling fluid comprises water and at least one of a pH modifier, a filtration control agent, a thickening agent, a clay inhibitor, or a weighting material.

12. The method of claim 11, wherein the aqueous drilling fluid comprises:

from about 20 wt. % to about 90 wt. % water;

from about 0.01 wt. % to about 1 wt. % soda ash;

from about 0.1 wt. % to about 2 wt. % starch;

from about 0.01 wt. % to about 1 wt. % xanthan gum;

from about 0.01 wt. % to about 1 wt. % caustic soda;

from about 0.01 wt. % to about 1 wt. % clay inhibitor; and a balance of the weighting material.

13. A drilling rig comprising:

a drill string assembly comprising a rotatable drill bit; and a fluid circulation system connected to the drill string assembly, the fluid circulation system comprising:

an aqueous drilling fluid comprising bentonite and a synthetic clay at a bentonite to synthetic clay ratio of about 5:1, wherein;

the bentonite has a density of about 2,200 kilograms per cubic meter ($kg/m^3$) to about 2,800 $kg/m^3$ and the synthetic clay has a density of about 700 $kg/m^3$ to about 1,300 $kg/m^3$;

the aqueous drilling fluid comprises from 0.02 wt. % to 0.4 wt. % of the synthetic clay and from 0.1 wt. % to 2 wt. % of the bentonite; and the aqueous drilling fluid has a yield point from 3,830 dynes per square centimeter ($dynes/cm^2$) to 23,940 $dynes/cm^2$;

a drilling fluid pit holding a volume of the aqueous drilling fluid; and a pump configured to flow the drilling fluid from the drilling fluid pit to the drill string assembly while the rotatable drill bit rotates.

14. The drilling rig of claim 13, wherein the aqueous drilling fluid is free of sepiolite and comprises:

from about 20 weight percent (wt. %) to about 90 wt. % water;

from about 0.01 wt. % to about 1 wt. % soda ash;

from about 0.1 wt. % to about 2 wt. % starch;

from about 0.01 wt. % to about 1 wt. % xanthan gum;

from about 0.01 wt. % to about 1 wt. % caustic soda;

from about 0.01 wt. % to about 1 wt. % clay inhibitor; and a balance of weighting material.

* * * * *